United States Patent [19]

Billington et al.

[11] 4,310,012
[45] Jan. 12, 1982

[54] THERMAL AND REMOTE VALVE CONTROL

[75] Inventors: Evans R. Billington, Glenview; Larry F. Odar, Northbrook, both of Ill.

[73] Assignee: Rego Company, Chicago, Ill.

[21] Appl. No.: 949,692

[22] Filed: Oct. 10, 1978

[51] Int. Cl.³ .............................................. F16K 13/04
[52] U.S. Cl. ...................................... 137/75; 137/77; 251/294
[58] Field of Search ....................... 137/72, 73, 75, 76, 137/77; 251/294, 337; 74/2; 185/9, 45

[56] References Cited

U.S. PATENT DOCUMENTS 3,165,236 1/1965 Beazer .................................. 137/77
4,099,551 7/1978 Billington .......................... 137/73 X Primary Examiner—Harold W. Weakley
Attorney, Agent, or Firm—Sixbey, Friedman & Leedom

[57] ABSTRACT

In combination with a relatively non-extendible emergency cable mechanically placed under tension and including a rigidly supported link having a fuse element and manual pull handle which are suggestive of their purpose and operation in the cable for alert and quck actuation of cut-off flow control valves of varying types of sensitivities to prevent serious escape of liquefied petroleum gas under high pressures, and also serving as a remote manual shut off control for terminating a delivery truck tank filling operation.

3 Claims, 7 Drawing Figures

THERMAL AND REMOTE VALVE CONTROL

BACKGROUND OF THE INVENTION

In the sale and distribution of liquefied petroleum fuel gas (L.P. Gas) it is conventional for a distributor to use large above ground bulk storage tanks to store the highly volatile and inflammable liquid under substantial vapor gauge pressure and then distribute it to customers by delivery truck tanks that are filled repeatedly from the storage tanks through detachable liquid supply and vapor return conduits which include flexible stretchable hoses detachably connected to the truck delivery tank. These conduits are permanently connected to the bulk storage tanks and have automatic cut off flow control valves at the outlets to the hoses.

It is desirable that the conduits be quite flexible hoses to accommodate a random and quick positioning of a tank truck for rapid connection thereto and filling. Preferably the transfer hoses are short, approximately seven feet long, and are comparatively small in diameter for strength and ease of handling, and also for rapid filling while, for safety, minimizing the volume of liquefied gas present at any given time in the hoses between the tanks.

Aside from maintaining the handling and filling equipment in acceptably safe condition, an ever present random danger conventionally exists in which, occasionally, for any one of several reasons, a delivery truck driver receiving L.P. Gas will move his truck during filling, or drive his replenished truck away while the hoses are still connected between the truck tank and storage tank. This ruptures the hoses under substantial tension and there is pressurized spillage of liquefied gas that rapidly creates a highly dangerous fire hazard.

Automatic outflow cut-off transfer valves have been used where a trip cut-off cord is connected to the truck which upon drive away trips a valve. However, many times it has been found that the cord is not attached to the truck during filling operations nor can it be operated quickly by hand if desired.

In the present invention, the valves are automatically closed before a rupture occurs in either hose, or by presence of fire, and also provide a location where the filling attendant must stand to shut off flow immediately when danger occurs. By way of illustrating the invention, the check valve not only closes in the direction of outflow, but preferably equalizes pressures on opposite sides of a swing filler valve and closes it. It also closes the valve if a fire may already have been started from sparks, or any one of several other reasons, or the attendant sees danger, or the filling is completed, there being advantages in using safeguarding equipment regularly.

One of the objects of the invention is to compel the followance of a proper sequence in a truck tank filling procedure to manually and automatically prevent any hazardous spillage if there is inadvertant drive away without hose disconnection, or fire, and prevents any further use without attention and repair.

Another object of the invention is to control and limit any escape of hazardous material to only a readily dispersible known amount and confine any damage to equipment that is easily restored or replaced.

Another object is to assure good inspection, by regular use, testing and upkeep of safeguards provided for the ultimate prevention of dangerous break-away spillage and fires.

Other and further objects include the inhibition of liquid transfer except by personnel present if automatic equipment might be defective or improperly handled and provide readily available means for shutting down equipment under dangerous conditions.

More particularly, the safety cut off control can be used manually and serve as an instant manual shut off control when the delivery tank is filled to its proper level. Thereupon, with the shut off thus triggered and accomplished automatically, the setting of all controls and connections can be finalized for disconnecting the truck tank safely from the storage supply tank.

SUMMARY OF THE INVENTION

The transfer of liquefied petroleum gas from a bulk storage tank to a truck delivery tank is made through stretchable flexible hoses secured to the storage tank supply conduits at one end and carrying at the other ends non-extendible pull cables secured to the detachable (truck) ends of the hoses with the free moving ends of the cables connected through manual and fuse controlled elements to manually as well as automatically shut off vapor and liquid flow control valves that are rigidly supported and attached permanently to the liquid and vapor conduits of the bulk storage tank. The valves are closed by tension or displacement of the cables to confine any escape of gas to the atmosphere to the residual amount of gas in the hose or hoses.

IN THE DRAWINGS

DESCRIPTION OF THE INVENTION

Figure 1:
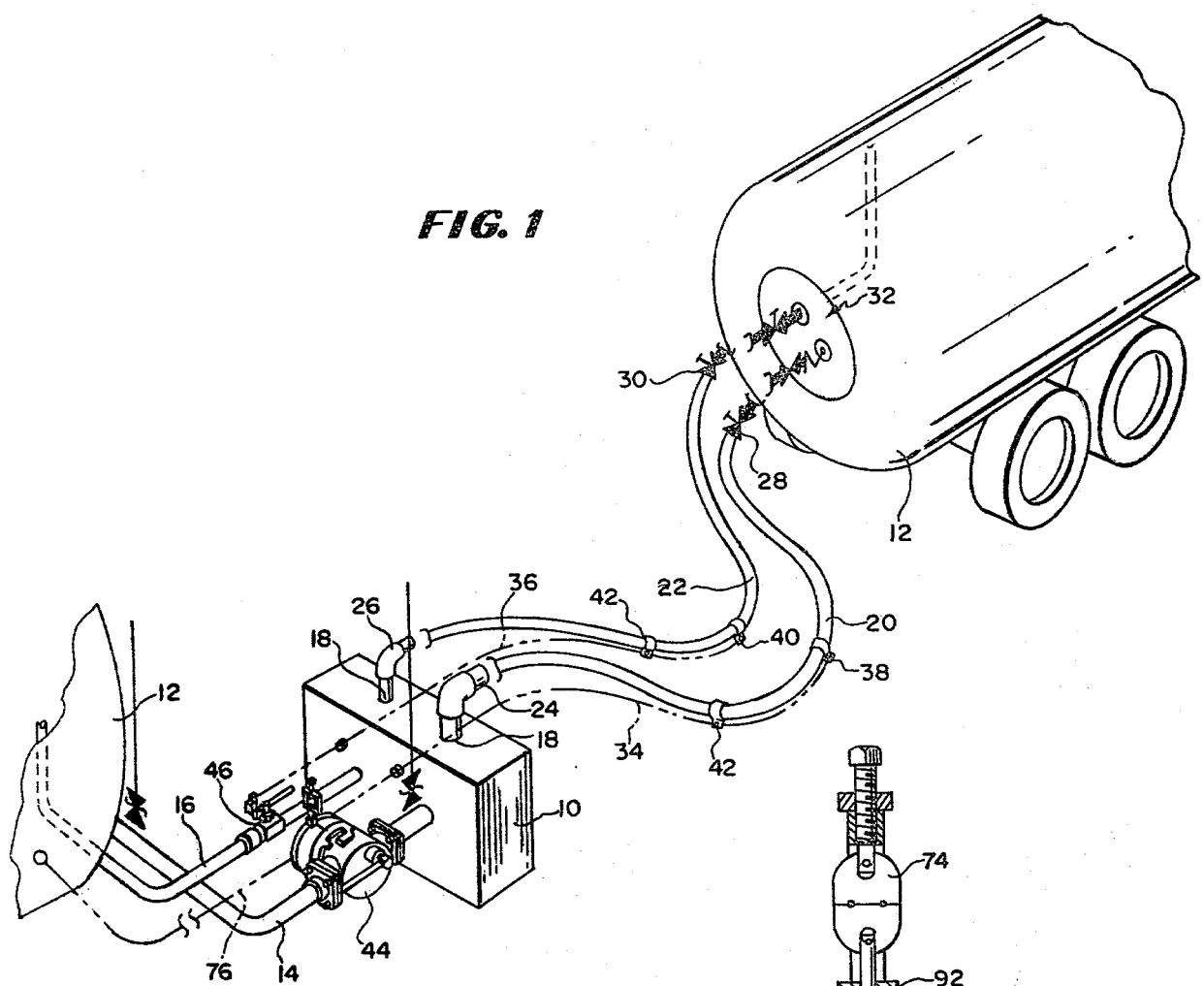
FIG. 1 is a schematic perspective view of a plant loading station employing a swing check valve as an emergency cut off valve that serves also as a shut-off valve equipped and connected to a truck delivery tank ready for loading.

An L.P. Gas bulk storage and truck tank loading station is illustrated in FIG. 1 preferably provided with a cement bulkhead 10 serving in part as a fire barrier, and upon which a valve housing can be rigidly mounted to withstand manual operation. The dispensing system for the tank includes a liquid supply conduit 14 from the tank 12 and vapor return conduit 16 to the tank firmly embedded as at 18 in the cement of the bulkhead 10 so that they are anchored to the earth to withstand any strains upon the rigid piping 14 and 16 and the valves and controls carried thereby with respect to the storage tank 12. The rigid piping extends a short distance beyond the bulkhead to provide rigid hose attachment extensions 24 and 26, respectively.

The protective equipment on the storage tank side of the bulkhead 10, not only includes novel automatic and manual flow controls and valves embodying invention but also flow control dispensing and safety valves (not illustrated) that are required by Government Regulations at the conduit connections 14 and 16 to the bulkhead storage tank.

On the service tank 12 side of the bulkhead 10, the conduit system includes flexible hoses 20 and 22 secured to the rigid extensions 24 and 26, for liquid filling and vapor return, and, at their free ends the hoses carry shut off valves 28 and 30 which in turn are connectible to the truck filler valve system 32. Supported in parallel relationship therewith are non-extendible cable means 34 and 36, respectively, secured at one end by clamps 38 and 40 to the hoses 20 and 22, respectively adjacent to the truck valve end and movable a substantial distance at the other end with respect to the hose. Thereby, when a hose is stretched, the cables are tightened to actuate a closing of the valve connected to the hose. The cables can be manually tightened also. Regardless of how a cable is tightened it performs work to actuate a valve to shut off flow in either respective hose before a hose connection bursts while carrying or a fire may have already started. This greatly reduces extensive dangers conventionally present in the field.

Although the cables may be paired with the respective hoses, each preferably is shown disposed in externally parallel relationship where they can be actuated by other means manually and where fire may already exist to provide relative free parallel movement between the members of each pair.

If either or both of the hoses are stretched by any truck pull away movement, as when the hoses 14 and 16 stretch and move with respect to their respective cables 34 and 36 the pull on the cables as when the hoses are placed under stretch strain approaching that which might otherwise be sufficient to cause the hose to tear and burst or not work at all. At their free ends or intermediate their ends, or additional cables may be displaced substantially by other elements and at least one of them will actuate and trigger the release of the liquid flow check valve 44 or 46, or both, to permit them to be moved to their closed position, by spring or by initial pressure fluid flow through them.

Thus, flexible cables are always present and may be used manually as well as automatically when needed for safety sake. They are also easy to inspect and keep in good repair for actuating one or more reliable safety closures of storage tank flow cut off valves. Not only is their contant presence assured safetywise, but also an optimum relation is provided in which the adjustment of such a cable means will enable any degree of shut off tension on the cable.

The safety cable 76 is always armed continuously for effectiveness under many contingencies related to storage tank outlet valves being closed, left open or only the shut off valves 28 and 30 being operated in a succession of service tank filling uses. As described they are designed for a variety of contingencies that could be involved including fuses and remote controls. Then, it is of ultimate importance that an attendant can judge the danger of fire, and the loss of liquefied gas is greatly reduced and limited to the fluid volumes of the hoses themselves which with these safe guards preferably need be only ten feet (3 meters) in length or less if desired.

LIQUID FLOW CONTROL VALVE

Figure 3:
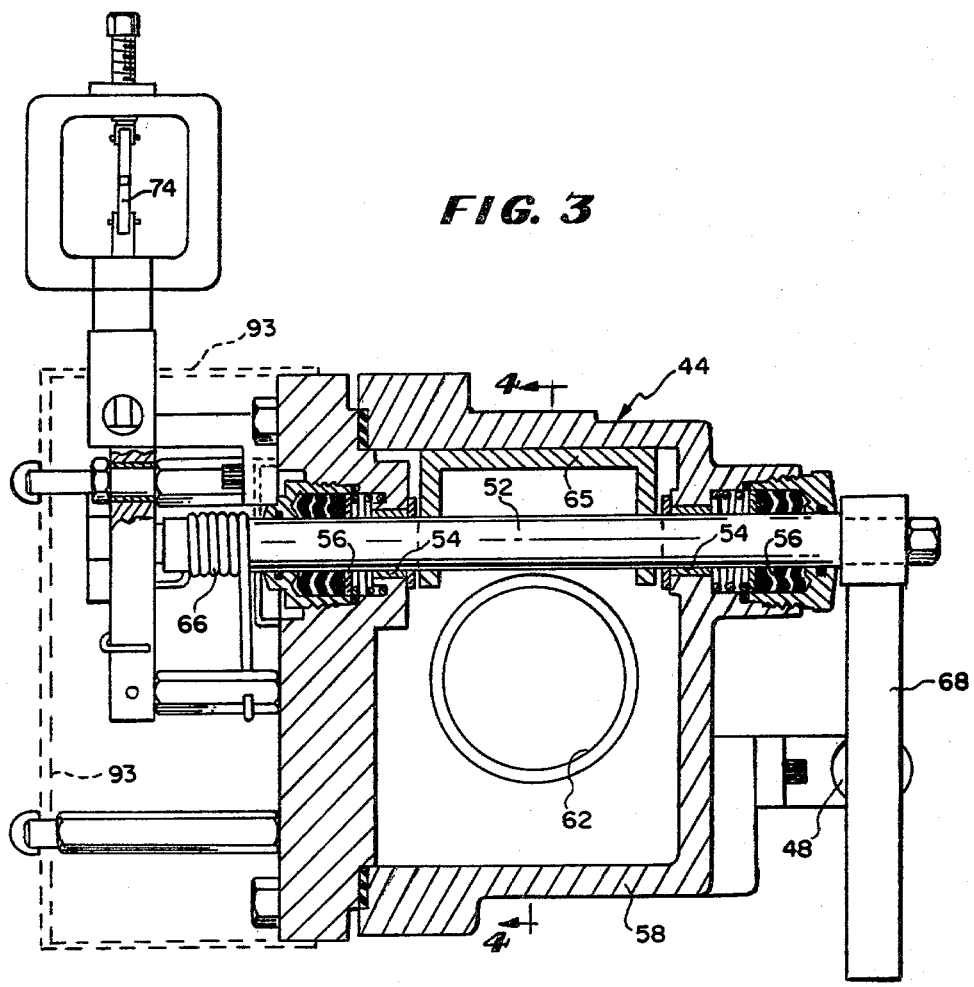
FIG. 3 is a sectional view taken on line 3—3, in FIG. 2.
Figure 4:
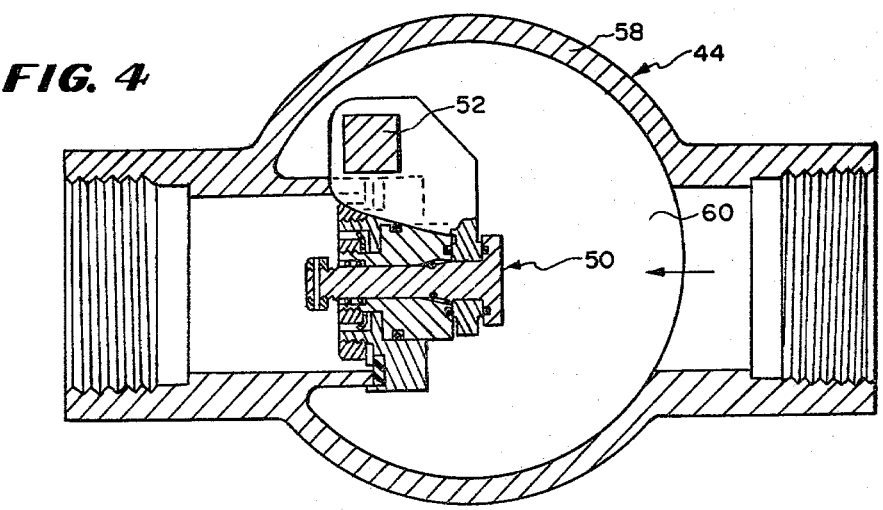
FIG. 4 is a sectional view tken on line 4—4, in FIG. 3.
Figure 5:
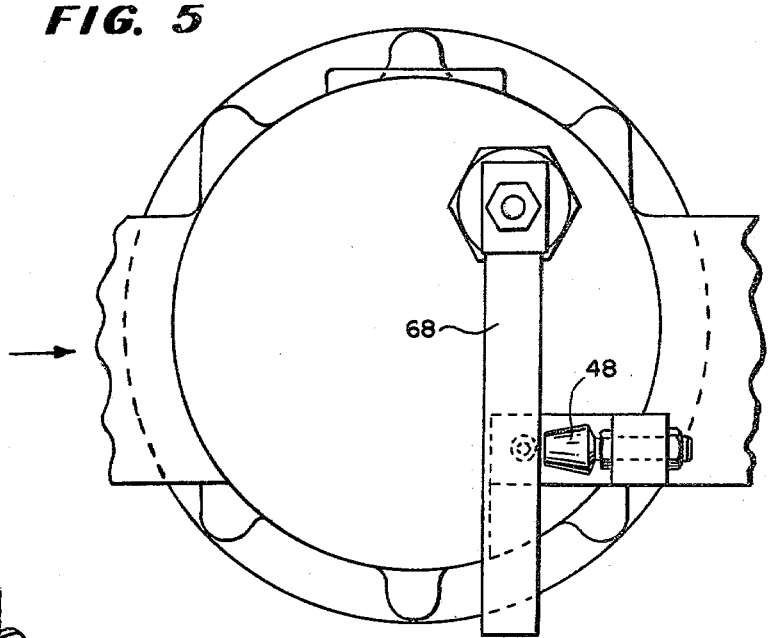
FIG. 5 is a side elevation of the manual control shown in FIG. 4.

Referring now to the manually opened liquid flow control valve 44, by way of example a swing check valve 50 (FIG. 4) is pivotally mounted on a shaft 52 journalled at 54 and sealed at 56 at both ends in a valve housing 58 that is connected in the liquid service conduit 14, with its inlet indicated at 60 and outlet valve seat at 62. The swing check valve 50 more specifically described in a cofiled application now U.S. Pat. No. 4,230,161, is oriented on the shaft to close in the direction of dispensing flow of liquefied petroleum gas liquid in the service conduit 14. One end of the shaft receives a handle 68 for manual opening and the other end receives a torque spring 66 urging closure and a trip arm 70 (FIG. 2) which is engaged by a latch 71 urged into latching engagement by a spring 72. This mechanism is protected against tampering by a removable cover 93 (FIG. 3)

Figure 2:
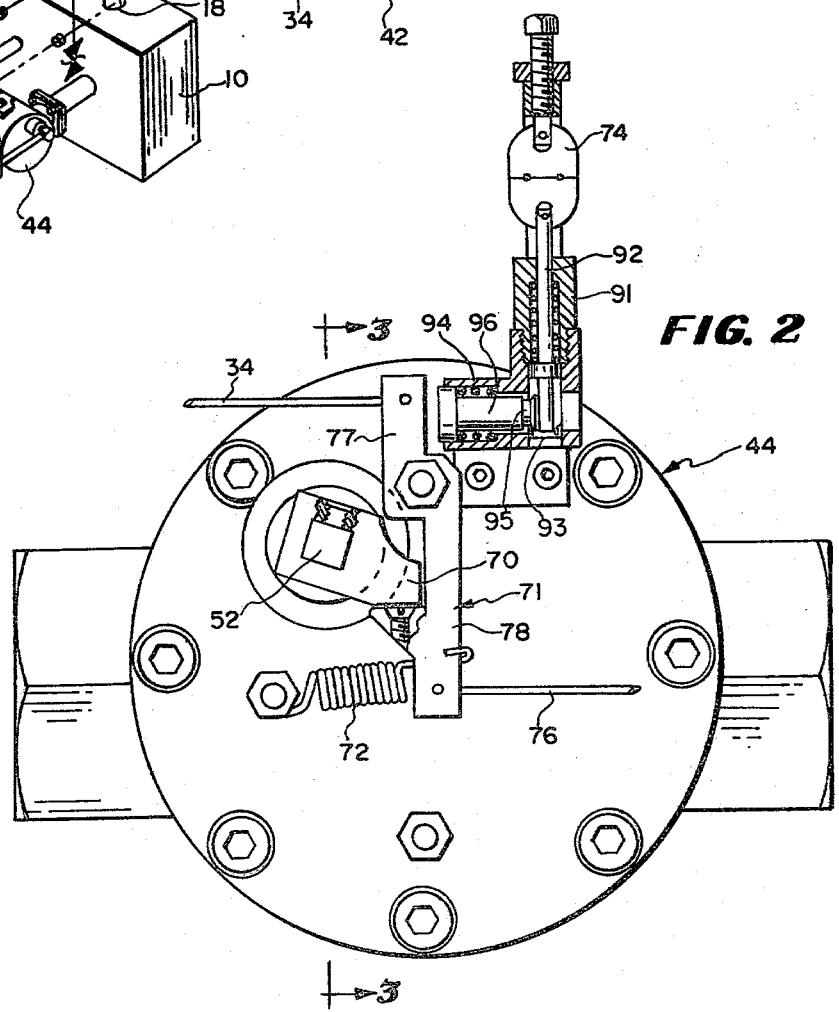
FIG. 2 is an enlarged side elevation of the swing check valve controls.

During a truck tank filling operation the valve 50 is manually opened by the handle 68 on one end of the shaft 52 and is held in its open position by the latch 71 while being filled or operating to fill the delivery truck tank 13 (FIG. 2)

The latch 71 is urged by the spring 72 to maintain engagement but is released to permit closure in event of:

(a) a truck break away while the hoses 14 or 16, or both, are still connected to the tank 12:

(b) the melting of a fuse metal link 74 released by the presence of any fire; or (c) the actuation by personnel of any one of several manual site controls 34 and 76 that are available, either directly or remotely, for tightening a cable for any one of a number of safety reasons to actuate the latch 71. Releasing the latch 71 permits rotation of the shaft 52 to close the valve 50 under the effort of the latch spring 72 and the force of flowing liquid passing through the valve, thereby shuts off the flow of liquid beyond the barrier.

The latch 71 is pivotally mounted on the housing intermediate its ends to provide actuatable arms 77 and 78 that receive the working ends of the independently actuated cables 34 and 76 which when actuated move the latch 71 to release the valve 50 for it to close.

Either one of the cables 34 and 76 may be operated manually while the other cable may be operated automatically by the stretch effect of the liquid hose 20 upon the cable 34 as noted.

The handle 68 is cushioned by a resilient bumper 48 to absorb the inertial energy of the valve 50 and handle. The handle 68 may be directly actuated by a heat meltable fuse 74 located wherever there is a critical danger of fire remote from the valve. The heat meltable fuse 74 may be mounted on the valve housing 58 where a spring held stem 92 is restrained by the intactness of the fuse 74 from releasing a piston 96 driven by a spring 94 to strike the upper arm 77 of the latch 71 and thereby release the latch 71, and hold it released for the swing check valve 50 to close until the fuse member 74 is replaced. When the fuse 74 melts, the lower end 93 of the stem 92 moves away from engagement with a groove 25 in the end of the piston to release the piston. The piston then moves outwardly from a housing 91 which encases the piston and stem.

Whenever released, the arm 68 on the valve shaft 52 is permitted to be turned by the shaft 52 to permit the spring urged swing valve 50 to close as an out flow check valve to protect the storage tank 12, and, no amount of manipulation of the handle 68 thereafter will permit unattended liquid outflow from the storage tank 12 until the fuse 74 is replaced and the piston 96 reset. This shut off check valve characteristic will prevail while the conventional excess outflow check valve of the truck tank will prevent flow therefrom if the liquid hose is also ruptured or disconnected.

Figure 6:
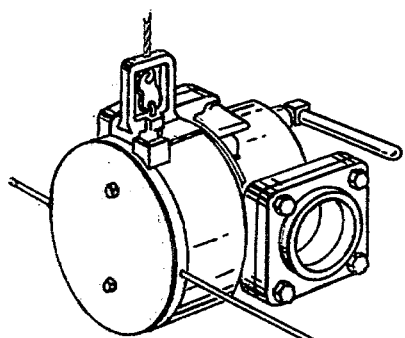
FIG. 6 is a perspective view partly in section showing a combined manual and automatic shut off control.
Figure 6:
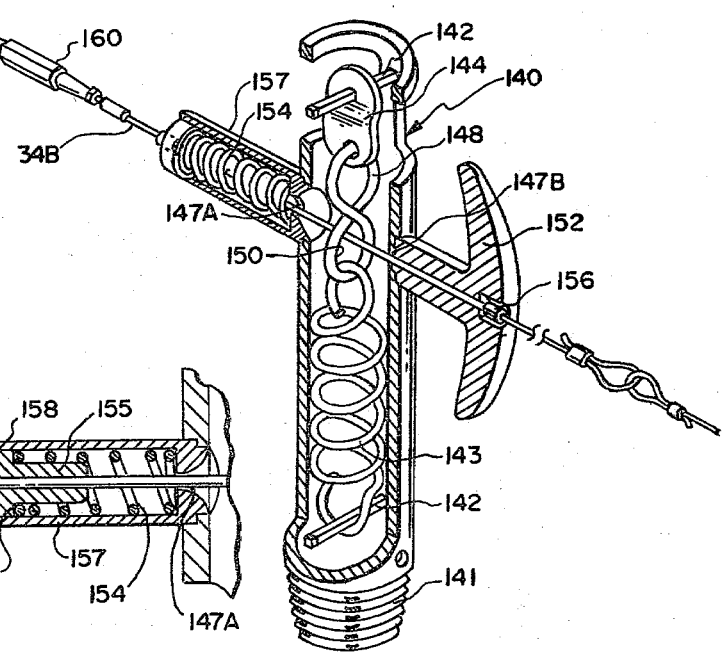
Figure 7:
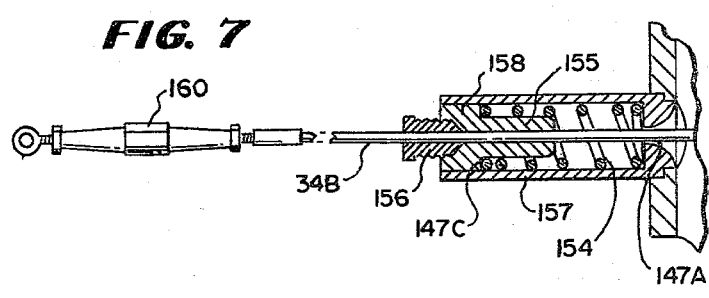
FIG. 7 is an enlarged sectional view of the cable guide and control.

Relating the control to one of the cables 34, 36 or 76, preferably 76 by way of example, which can be a shielded cable if desired, for controlling liquid flow, an auxiliary tubular housing 140 is preferably threaded at 141 for rigid flange support at a right angle to the cable 34 in FIG. 6. In the housing 140 between two vertically spaced horizontal cross pins 142 a serially connected linkage is stretch supported which includes a coiled spring 143 under tension, a double eye chain link 148, and a fuse link 144. A portion 34B of the cable 34 extends through the link 148 as slidably supported in openings 147A and 147B located in the wall of the tubular member, colevel with the upper limit of an opening 150 through the link 148.

In a tubular housing portion 157 supported at one of the openings a retracting compression spring 154 is movably supported at one end by a guide 155 slidable in the housing portion 157 supported at its outer end by a shoulder 158. At its inner end the housing portion 157 defines the opening 147A flared inwardly for supporting the cable 34B without damaging it in its operation. For manual actuation, a pull handle 152 is received on the other end of the cable 34B beyond the opening 147B and the spring 154 is suitably compression-tensioned on the cable 34B by ferrule type retainers 156, one of which locates the guide 155 flush with the end of the tube for compression of the spring 154 and the other against the handle to hold it in a retracted resting position under the influence of the compressed spring 154. Preferably a turnbuckle 160 interconnects the cable portions 34 and 34B to adjust the resting position and the work effort of the pull handle 152 for the actuating of the flow shut off valve to which it is connected. The length of the guide prevents over pull on the cable 34.

A melting fuse link 144 releases the spring 143 for it to draw downward a substantial portion of the cable 34B into the tubular member 140 thereby shortening the cable 34 in a manner triggering the latch 71 for the closing of the swing valve 50 as in manner already described. Protectively, the valve 44 cannot be reopened until the fuse link 144 is restored with tools assuring the attention of experienced personnel even to the point of enabling a ready replacement, the cable section 34B preferably being straight for threading through aligned openings once the fuse 144 is replaced. Preferably a turnbuckle 160 is provided for adjusting the length and tension on cable 34 and cable 34B.

What is claimed is:

1. In a liquefied petroleum gas dispensing system having a control valve and valve operator means movable between an open position wherein said control valve is held open and a closed position wherein said control valve is permitted to close, a valve shutoff control unit comprising support means, said support means including a housing having a first housing section defining a first chamber and a second housing section defining a second chamber in communication with said first chamber and extending in a direction transverse thereto, said second housing section being open at one end remote from the juncture thereof with said first housing section, valve operator activation means mounted in said second chamber for movement between a first and a second position, said valve operator activation means being operative in said second position to cause said valve operator means to move to said closed position, said valve operator activation means including a piston adapted to travel outwardly through the open end of said second housing section and into contact with said valve operator means during movement of said valve operator activation means from said first to said second position, first biasing means mounted in said second chamber and operative to bias said piston toward said valve operator means, and thermal control means mounted in said first chamber and operative in response to temperatures above a predetermined range to cause said valve operator activation means to move from said first to said second position, said thermal control means including a movable actuator means mounted within said first chamber for movement in a direction substantially transverse to the direction of movement of said valve operator activation means between said first and second positions, said actuator means being operative to contact said piston to restrain said piston from traveling outwardly through the open end of said second housing, a thermal fusion link means mounted within said first chamber and extending between said first housing section and said movable actuator means, said thermal fusion link means operating in response to temperatures above said predetermined range to release said actuator means such that said actuator means releases and moves away from contact with said piston, and second biasing means mounted within said first chamber and connected between said first housing section and said actuator means to bias said actuator means away from said thermal fusion link means, said second biasing means causing movement of said actuator means upon the release thereof by said thermal fusion link means.

2. In a liquefied petroleum gas dispensing system having a control valve and valve operator means movable between an open position wherein said control valve is held open and a closed position wherein said control valve is permitted to close, a valve shutoff control unit comprising support means, valve operator activation means mounted upon said support means for movement relative thereto between a first and a second position, said valve operator activation means being operative in said second position to cause said valve operator means to move to said closed position, first biasing means mounted upon said support means and operative to bias said valve operator activation means, and thermal control means mounted upon said support means and operative in response to temperatures above a predetermined range to cause said valve operator activation means to move from said first to said second position, said thermal control means including a movable actuator means mounted for movement upon said support means into and away from contact with said valve operator activation means, said actuator means being movable relative to said support means in a direction which is substantially transverse to the direction of movement of said valve operator activation means between said first and second positions, a thermal fusion link means extending between said support means and said movable actuator means, said thermal fusion link means operating in response to temperatures above said predetermined range to release said actuator means from said support means, and second biasing means connected between said support means and said actuator means to bias said actuator means away from said thermal fusion link means, said second biasing means causing movement of said actuator means upon the release thereof by said thermal fusion link means, said support means including a housing, said actuator means, thermal fusion link means and second biasing means being serially mounted within said housing with said thermal fusion link means and said second biasing means being connected to said housing in spaced relationship and said actuator means being connected to extend between said thermal fusion link means and said second biasing means, said actuator means having an opening extending therethrough intermediate the ends thereof, said valve operator activation means including an elongated cable, connection means for connecting said cable to a first side of said housing, said cable extending from said connection means through the first side of said housing, through the opening in said actuator means and outwardly from said housing through a second side thereof opposite to said first side and then to said valve operator means, said first biasing means being mounted within said housing and extending between said housing and a portion of said cable adjacent said second side of said housing to hold said cable taut, said first biasing means operating to bias said cable toward said second side of said housing, said connection means including a handle external to the first side of said housing and operative to draw said cable through said housing against the bias of said first biasing means, said cable also being drawn into said housing through the second side thereof against the bias of said first biasing means when said actuator means is released by and moves away from said thermal fusion link means.

3. A valve shutoff control unit for operating a remote valve comprising a housing, a thermal fusion link means mounted within said housing and secured thereto, an actuator means positioned within said housing and having a first end thereof connected to said thermal fusion link means, said actuator means having an opening extending therethrough, a spring means connected between a second end of said actuator means and said housing and operating to bias said actuator means away from said thermal fusion link means, said thermal fusion link means operating in response to temperatures above a predetermined range to release said actuator means, cable means extending through an opening in a first wall of said housing and through the opening in said actuator means, and connection means to connect said cable means to a second wall of said housing opposite said first wall, said spring means operating to move said actuator means away from said thermal fusion link means when said actuator means is released thereby to cause said actuator means to draw said cable into said housing.

* * * * *